United States Patent [19]

Frick et al.

[11] Patent Number: 4,833,922
[45] Date of Patent: May 30, 1989

[54] MODULAR TRANSMITTER

[75] Inventors: Roger L. Frick, Chanhassen; Dean S. Pierce, St. Paul; David A. Broden, Chanhassen, all of Minn.

[73] Assignee: Rosemount Inc., Eden Prairie, Minn.

[21] Appl. No.: 57,048

[22] Filed: Jun. 1, 1987

[51] Int. Cl.$^4$ ............................ G01L 7/08; G01L 9/00; G01L 13/02
[52] U.S. Cl. ........................................ 73/756; 73/706; 73/717
[58] Field of Search ............... 73/756, 706, 716–729; 336/30; 338/42; 361/283

[56] References Cited

U.S. PATENT DOCUMENTS

| | | | |
|---|---|---|---|
| 2,841,984 | 7/1958 | Green | 73/706 |
| 3,853,007 | 12/1974 | Jaquith | 73/706 |
| 4,370,890 | 2/1983 | Frick | 73/706 |

Primary Examiner—Donald O. Woodiel
Attorney, Agent, or Firm—Kinney & Lange

[57] ABSTRACT

A transmitter provides an output that is indicative of pressure and has two modular transmitter bodies, one including a sensor, and the other having an isolator diaphragm with a substantially non-compressible fluid that transfers movement of the isolator diaphragm to the sensor. The bodies each have mating passageways to transfer non-compressible fluid from one body to the other and are assembled together using a ring of extrusile material disposed around the mating portions of the passageways to seal the passageways together when the transmitter bodies are assembled. The isolation fluid is filled in the passageway of the bodies before the first and second transmitter bodies are assembled. The assembly can be accomplished without complex procedures and still insure that accurate transmitter operation will be obtained.

11 Claims, 3 Drawing Sheets

MODULAR TRANSMITTER

BACKGROUND OF THE INVENTION

1. Field of the Invention.

The present invention relates to a modular transmitter construction wherein transmitter body components can be easily assembled into a complete transmitter for permitting forming a wide number of different transmitters utilizing a relatively low number of individual components.

2. Description of the Prior Art.

Differential pressure transducers which have a deflecting sensing diaphragm coupled to isolation diaphragms are commonly known. The isolation diaphragms are slack diaphragms that isolate the sensing diaphragm from the corrosive process fluid being sensed. In order to transfer pressures from the isolation diaphragms to the sensing modules, a substantially noncompressible fluid fill is provided in passageways and chambers between the isolation diaphragms and the sensing diaphragms. It has been a common practice to assemble sensor and isolation diaphragm components in a subassembly and then the passageways and chambers are filled with the noncompressible fluid. Usually a separate fill tube leading to the chambers and passageways is provided for filling and the fill tube sealed off when the filling is accomplished. The filling itself generally requires submerging the subassembly during the filling process and then pinching off the fill tubes. The subassemblies thus take a long time to build and have a high labor and material cost.

When such subassembly including the sensor and isolation modules was made, the failure of any of the parts, such as the sensing diaphragm or an isolation diaphragm during the manufacturing process would result in scrapping the entire costly subassembly. It also was necessary to stock virtually all of the available options as finished subassemblies, in order to meet reasonable delivery schedules, thereby increasing substantially the capital required for inventory.

FIG. 1 of the drawings in this application schematically shows a typical prior art arrangement, including a transmitter 10 that has a sensor body 15, and an isolation body 12. The isolation body 12 includes isolation diaphragms 13 and 14, that enclose chambers 13A and 14A that are filled with a substantially noncompressible fluid. In order to connect these chambers 13A and 14A to a sensor body 15, tubes 16 and 17 respectively are connected to passageways in the isolation body 12 and welded in place with suitable welds indicated at 16A and 17A respectively. The tubes open to chambers on opposite sides of a sensing diaphragm 15A. In order to fill the tubes 16, 17 as well as the chambers on opposite sides of the sensing diaphragm 15A for the sensor 15, fill tubes indicated generally at 18 and 19 are provided in the isolation body and extend from the exterior thereof into the chambers 13A and 14A, respectively. The chambers, tubes and passageways may be evacuated and silicone oil is then filled in through these fill tubes. The fill tubes are pinched off and sealed by welding or with suitable caps. In order to make the assembly, it requires substantial labor, and the subassemblies of the sensor body and the isolator body become quite expensive. For each different transmitter configuration (i.e. different pressure range or the like), each individual configuration has to be separately made as a complete subassembly.

SUMMARY OF THE INVENTION

The present invention relates to a modular transmitter including a transmitter sensor body, and a transmitter isolator body which are coupled together to make a transmitter. The isolator body has an isolator diaphragm substantially as shown in the prior art and a passageway that carries a substantially noncompressible fluid from the isolator diaphragms to an aligning passageway in the transmitter sensor body leading to the sensing element (shown as a sensing diaphragm) in the transmitter sensor body. An extrusile ring seal is positioned between the two transmitter bodies in position surrounding and sealing the ports leading to the aligning passageways. The ring seals extrude under compression force as the transmitter sensor body and transmitter isolator body are forced together along an interface.

The chambers and passageways in the bodies can be separately prefilled with the substantially noncompressible fluid for the transfer of pressures and movements from the isolation diaphragms to the sensor before assembly and complex manufacturing procedures such as welding a liquid-filled tube are avoided.

The construction of the transmitter permits the transmitter to be filled with the selected quantity of isolation fluid without the need for a separate fill tube in the transmitter and without contaminating the isolation fluid with air. The total quantity of fill fluid in the transmitter can thus be reduced by a significant percentage and the sensitivity of the transmitter to temperature change can thus be reduced as a well.

The transmitters can be assembled from transmitter bodies selected from a group of first transmitter bodies which include sensors, for example having different pressure ranges, and a group of second transmitter bodies comprising the isolator bodies that have isolator diaphragms formed of different materials compatible with different process fluids adapted to receive or fit different flanges used for connecting the process fluid to the isolation diaphragms may also be used.

Because the groups of transmitter bodies are modular, and have common mounting dimensions, they can be interchanged and a small number of different first transmitter bodies and a small number of second transmitter bodies can be assembled into a large member of finished transmitter combinations.

In this way, the cost of production and the cost of maintaining inventories are both reduced in a simple, direct manner.

DETAILED DESCRIPTION OF THE PREFERRED EMBODIMENTS

Figure 1:
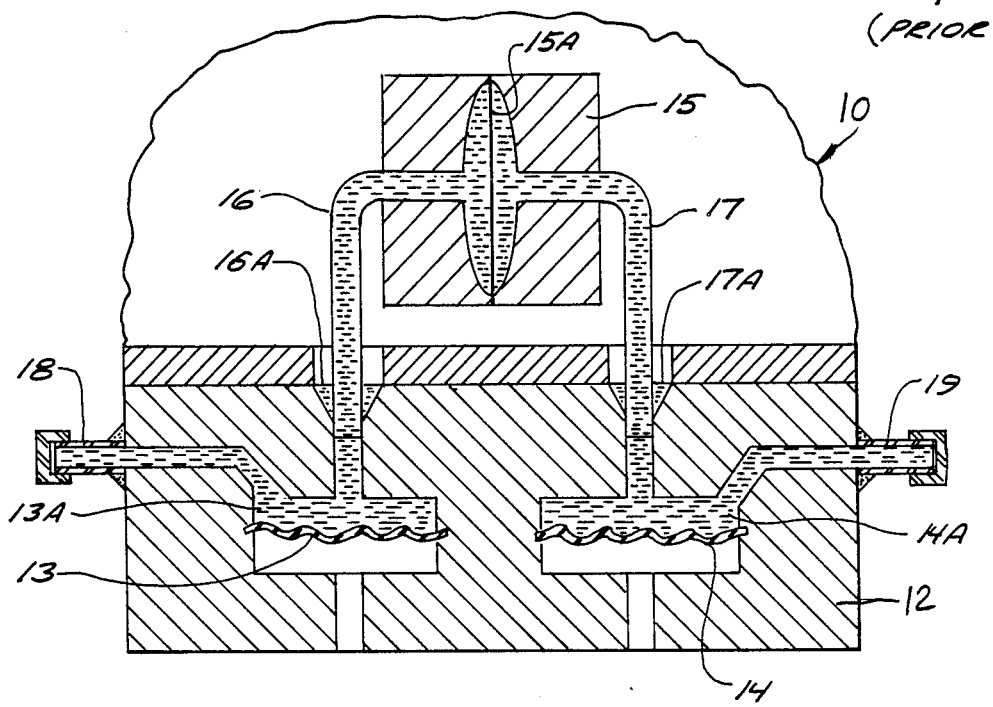
FIG. 1 is a schematic representation of a typical prior art transmitter.

The prior art showing in FIG. 1 has been previously explained. The device of the present invention shown in FIGS. 2 and 4 comprises a first transmitter sensor body indicated generally at 20, which, as shown, is a housing for electronic circuitry and a sensor assembly. The sensor assembly includes a sensing element and the electronic components that are needed for receiving the signals from the sensor and providing a output that indicates a parameter being sensed and which can be used for further process control. In this form, the transmitter sensor body 20 has an interior chamber 21 in which a differential pressure sensor 22 is mounted. Sensor 22 has a housing 23 with an interior chamber 24 divided into chamber portions 26 and 27 with a deflecting or sensing diaphragm 25. The diaphragm 25 is made to deflect under pressure differentials and the position of the diaphragm relative to the surfaces of the housing forming the interior chamber portions 26 and 27 is detected by sensing means, such as capacitive sensing. The transmitter sensor body 20 may have other types of sensors, such as semiconductor pressure sensors or strain gauge or piezoresistive sensing therein, if desired.

The pressure acting on the sensing means comprising diaphragm 25 is provided from an isolator transmitter body indicated generally at 30 that receives the fluid pressure to be sensed and transmits such pressure to the sensor diaphragm. The isolator transmitter body, in the form shown, comprises a plate-like member that has a first isolator diaphragm 32 and a second isolator diaphragm 33 that enclose chambers 34 and 35. The chambers open to passageways 36 and 37, that in turn open through ports 36A and 37A to an exterior surface 38 that is an interface surface mating with an interface surface 39 of the first mentioned transmitter body including the sensor.

Figure 3:
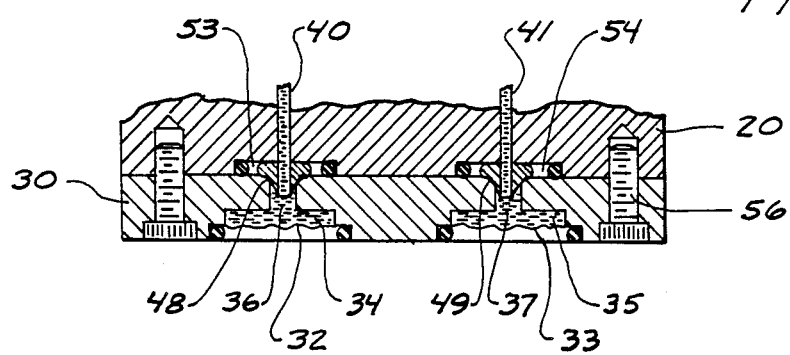
FIG. 3 is a fragmentary sectional view of the device of FIG. 2 in assembled position.

The isolator diaphragms have surfaces opposite from the chambers 34 and 35 that are open to receive pressure from a pressure source which will act on the exterior surfaces of the isolator diaphragms. A substantially noncompressible fluid, such as silicone oil, fills the passageways 36 and 37 and the chambers 34 and 35. In order to transfer pressure acting on the isolator diaphragms to the sensing diaphragm 25, the housing 23 has tubes 40 and 41 connected to chambers 26 and 27, respectively, that pass through the wall 42 of the transmitter sensor body 20. The tubes 40 and 41 extend outwardly from the transmitter body and have ports 44 and 45 at their outer ends. The extension of the tubes from the surface 39 will fit down into the passageways 36 and 37 when the two transmitter bodies are assembled together as shown in FIG. 3. Separate extrusile material ring seals indicated at 48 and 49, respectively, surround the ports 44 and 45. In particular, in the form shown, the ring seals surround the extensions of the tubes 40 and 41 outwardly beyond the interface surface 39. As shown, recesses 53 and 54 are formed in the interface surface. The recesses have base surfaces that extend radially from the tubes 40 and 41 and are larger than the extrusile material rings before sealing the transmitter bodies together. The extrusile material preferably is a metal that will extrude under compression. Initially, the rings 48 and 49 extend beyond the interface surfaces so they will be engaged by the transmitter isolator body interface surface and compressed. O-rings 58 also are provided for sealing the recesses 53 and 54.

The passageways 36 and 37 have slightly tapered outer portions forming the ports 36A and 37A, so that when the bodies are forced together the extrusile material will extrude tightly against the tapered surfaces, and against the outwardly extending portions of the tubes 40 and 41 to provide a seal around the aligning ports of the transmitter body portions, comprising the transmitter sensor body and the transmitter isolator body.

The transmitter isolator body 30 is fastened to and compressed against surface 39 of the wall 42 through the use of cap screws shown at 56, that fit into threaded openings in the wall 42.

In order to connect sources of fluid pressure to the isolator diaphragms, an adapter plate indicated generally at 60 will be fastened to the outer surface of the transmitter isolator body with suitable cap screws 61. This adapter plate has passageways 62 and 63, respectively, that can be coupled using standard flange adapters, to pressure sources. The transmitter assembly requires only two "wetted" bodies, that is, the transmitter sensor body and the transmitter isolator body, which carry the noncompressible fluid for transmitting movement from the isolator diaphragms to the sensing diaphragm.

Figure 2:
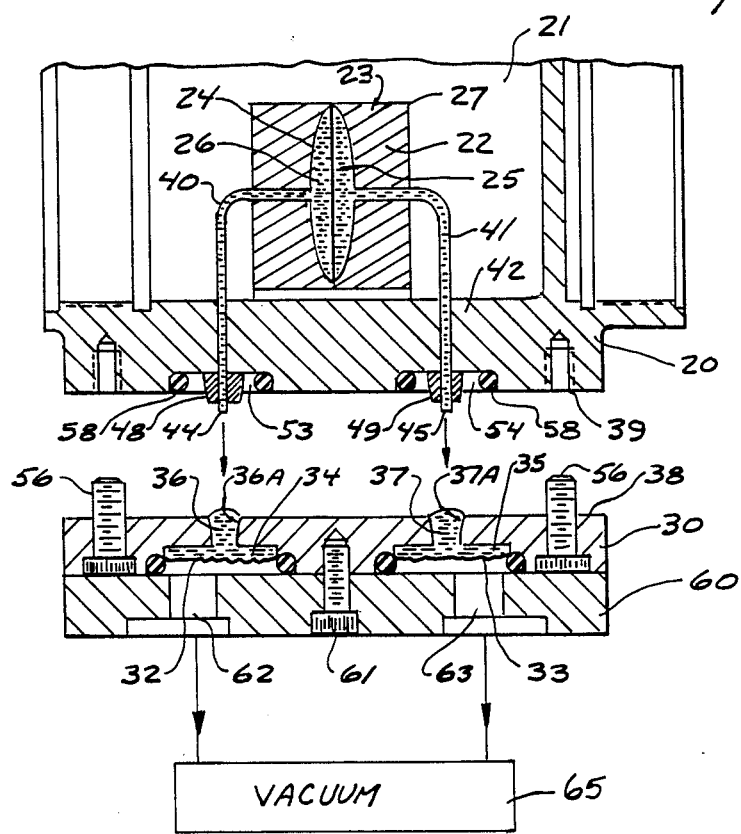
FIG. 2 is a exploded schematic representation of a transmitter made of modular transmitter bodies according to the present invention.

When the bodies 20 and 30 shown in FIG. 2 are to be assembled, the chamber portions 26 and 27, on opposite sides of the sensing diaphragm 25, and the tubes 40 and 41 can be filled with silicone oil by inverting the body and, if necessary, evacuating the chamber portions to draw in oil. Because only one body is involved, the task is simplified. Capillary action will retain the oil in the tubes 40 and 41 and the chambers 26 and 27 when the transmitter sensor body is inverted. The passageways 36 and 37 and the chambers under the isolator diaphragms 32 and 33 can be filled by gravity, through the passageways 36 and 37. A vacuum pump indicated generally at 65 can be coupled to the passageways 62 and 63 and by controlling the amount of vacuum the deflection of the slack isolator diaphragms (which are corregated and easily moved) can be controlled so that the volume in the passageways 36 and 37 and the chambers 34 and 35 under the isolator diaphragms can be controlled. When the passageways are filled with fluid, the surface tension of the oil will provide a slight crown.

Then, the transmitter isolator body 30 is clamped against the transmitter sensor body using the cap screws 56. The extrusile material ring seals 48 and 49 at the interface will extrude under compression loads to seal around the ports leading to the tubes 40 and 41, and provide a positive seal, with some of the oil in the passageways 36 and 37 being squeezed out as the end portion of tubes 40 and 41 extend into the passageway ends, and also as the extrusile material is extruded into place to form the seals. The vacuum can be released after extrusion, and the slack isolator diaphragm will not move significantly.

FIG. 3 shows a typical seal at the interface after the transmitter bodies are assembled. The extrusile material rings (soft metal) extrude to form metal to metal, permanent seals. The recesses 53 and 54 permit the extrusile material to be extruded radially so the interface surfaces have adequate contact. The sealing method avoids introduction of undesired air bubbles in the isolation fluid.

Figure 4:
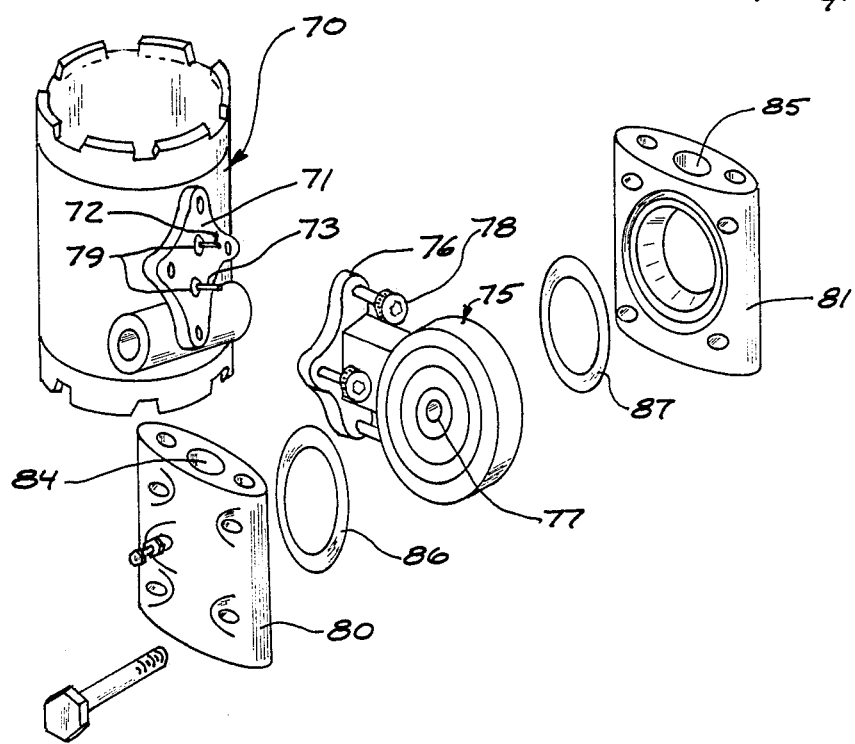
FIG. 4 is an exploded exterior view of transmitter bodies used for making transmitters according to the present invention.

In FIG. 4, an exterior view of a typical transmitter assembly is shown in exploded form. In this form, the connections between the two transmitter bodies is the same as that previously shown, but includes an electronics and sensor transmitter body indicated generally at 70, that has a flange surface 71, with tubes 72 and 73, respectively, leading to the sensor and corresponding to the tubes 40 and 41. The isolator transmitter body indicated generally at 75 has a mating flange 76 that will mate or interface with the flange surface 71. The isolator transmitter body has the isolator diaphragms on opposite sides thereof. One of the isolator diaphragms is shown at 77. The passageways on the interior of the isolator transmitter body are the same as those shown schematically in FIG. 2. When the flange 76 is placed against the flange 71, and suitable cap screws 78 are used for tightening the isolator transmitter body down, the extrusile material seals 79 will be extruded to seal the aligning ports and passageways in the two transmitter bodies and form the seals that are needed for operation.

Suitable, conventional flanges typically shown at 80 and 81, respectively can be clamped onto the isolator housing 77 on opposite sides to overlie the isolator diaphragms. The flanges are connected to desired sources of pressure through ports indicated generally at 84 and 85, respectively. Seals 86 and 87 can be used for sealing the flanges 80 and 81 onto the isolator body 75 surrounding the isolator diaphragm 77.

Having a selection of differently configured sensors in the transmitter sensor body, for example sensors of different pressure ranges, that can mate with a selection of transmitter isolator bodies 75 that perhaps have different types of isolator diaphragms 77 thereon, permits making assemblies of transmitters that can easily be varied as desired.

The transmitter bodies form subassemblies which are inexpensive and can be stocked as separate modular bodies. The final assembly of the transmitter consists of bolting two bodies together while the passageways are oil filled. The customer's order can determine which type of transmitter sensor body is fitted on the respective transmitter isolator body. Low cost coplanar wetted parts, medium cost process grade wetted parts, and flush diaphragms all can be accomodated by selecting the isolator body.

The present invention also has the advantage of simplifying the oil filling process, in that by applying the vacuum to the isolator diaphragms when the oil is filled in, the volume of oil can be controlled. Gravity will hold the oil in the isolator passageways and chambers. The sensor transmitter body will retain the oil due to capillary action, and then when the extrusile ring is extruded, it will extrude into the provided recess surrounding the ports or passageways between the transmitter bodies and will form a metal to metal seal. This metal to metal seal eliminates contamination problems encountered with welding or brazing of the tubes, as done in the previous devices, and also eliminates damage due to the heat from the welding. The extruded seal is much more reliable than devices built with organic O-rings in contact with the process fluids. In this type of a transmitter, a small leak of the silicone oil which is normally the isolation fluid fill, is disastrous, since the total oil volume is very low in these pressure transmitters. Thus, the positive extruded seals forming metal to metal seals are desired.

The total oil volume also can be kept lower with the present invention than with conventional prior art approaches so that the effect of expansion and contraction of the oil is minimized due to the lower volume. A minute amount of air that may be present at the time of filling will be absorbed by the silicone oil and not cause a problem. There is no need for separate fill tubes with the present arrangement.

Figure 5:
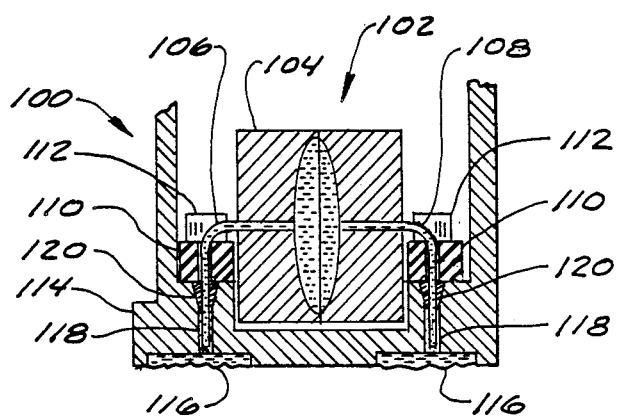
FIGS. 5, 6 and 7 are fragmentary sectional views of transmitters according to the present invention.

In FIG. 5, a modified form of the invention is shown. A portion of a transmitter 100 is shown in cross section and includes a first transmitter body 102 which comprises a sensor 104 which has a central chamber divided by a diaphragm and tubes 106 and 108 filled with substantially incompressible fluid for transferring pressure to the sensor. The transmitter includes an output circuit (not shown) as explained above. The first transmitter body 102 further comprises a ring 110 having holes therethrough for receiving tubes 106 and 108 and bolts 112. A second transmitter body 114 has a pair of isolator diaphragms 116 disposed thereon for receiving process fluid pressures. A pair of passageways 118 extend from tapered inlets to the chambers enclosed by the isolator diaphragms. The passageways 118 and chambers are filled with substantially incompressible fluid for coupling pressure from the isolator diaphragms 116 through tubes 106 and 108 to the sensor 104. The tubes 106 and 108 have portions which extend outwardly from the ring 110 and which portions surrounded by extrusile seals 120. The outwardly extending portions of the tubes 106 and 108 are inserted into the respective passageways 118. The bolts 112 are screwed into the second transmitter body 114 and tightened to compress the extrusile seals 120 between the ring 110 and the second transmitter body 114. The isolator diaphragms 116 are thus fluidly coupled to transmit pressure through substantially incompressible fluid to the sensor 104 and air is excluded from the tubes 106 and 108 and the passageways 118. The second transmitter body 114 has walls which define a chamber to receive the body 102 comprising the sensor 104, tubes 106, 108 and ring 110.

Figure 6:
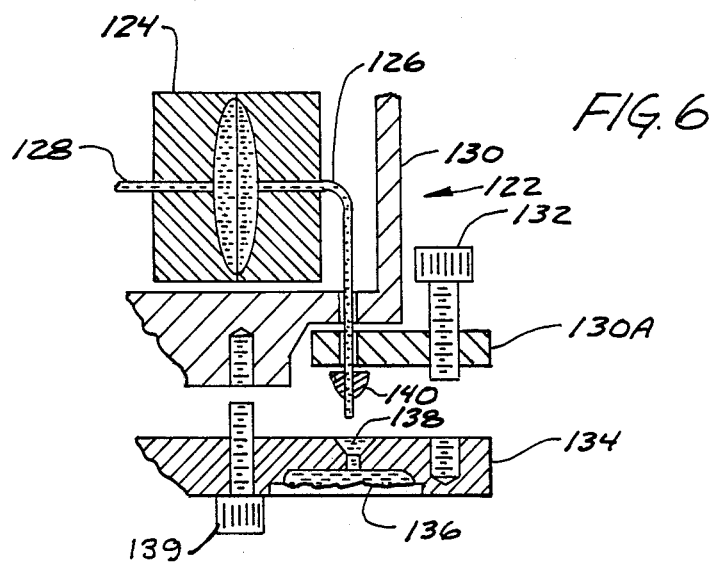

In FIG. 6, a portion of a transmitter 100 is shown in fragmentary cross section. A first transmitter body 122 comprises a sensor 124 with an interior chamber and tubes 126 and 128 filled with substantially incompressible fluid as explained above. The first transmitter body further comprises a main body 130 and retainer plates 130A (one of which is shown) having holes therethrough for receiving tubes 126, 128 and bolts 132. A second transmitter body 134 has a pair of isolator diaphragms 136 disposed thereon (one is shown) for receiving process fluid pressures. A passageway 138 extends from a tapered inlet port to the respective chamber defined by the isolator diaphragms 136. The passageways 138 and chambers are filled with substantially incompressible fluid for coupling pressure from the isolator diaphragms 136 to the sensor 124. The tube 126 has an end portion which is surrounded by an extrusile seal 140. The end portion of the tubes is inserted into the aligned passageway 138. The bolt 132 is screwed into the second transmitter body 134 to compress the extrusile seal 140 between the first transmitter body 122 and the second transmitter body 134. The isolator diaphragm 136 thus transmits a pressure through the substantially incompressible fluid to the sensor 124. Air is excluded from the tube 126 and the passageway 138. A bolt 138 further provides mechanical fastening between the first and second transmitter bodies 122,134. The mechanical fastening function and the sealing force are provided by separate bolts 132,138 to increase reliability of the seal. The connection of tube 128 to its respective passageway 138 and chamber enclosed by a second diaphragm 136 is identical to that shown for tube 126.

Figure 7:
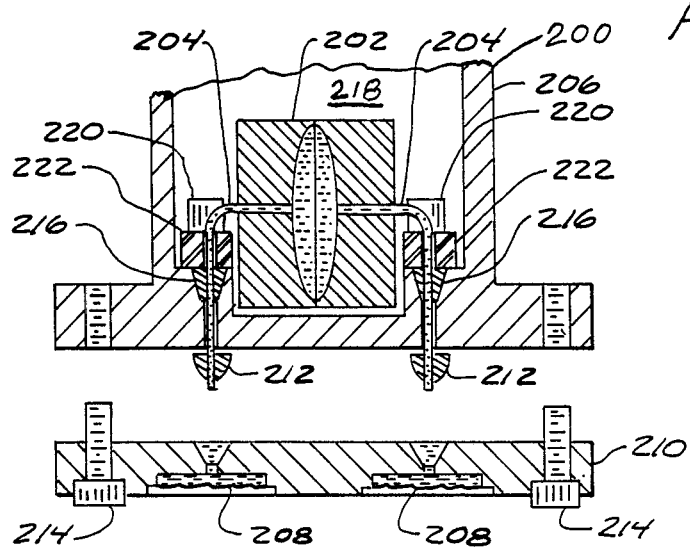

In FIG. 7, a further modified form of the invention includes a transmitter 200, a portion of which is shown. A sensor 202 with an interior chamber and tubes 204 in a first transmitter body 206 are connected together and the sensor and tubes 204 are filled with a substantially incompressible fluid for coupling pressure to the sensor. The tubes 204 have outer ends which will lead into passageways leading to chambers defined by isolator diaphragms 208 in a second transmitter body 210. Extrusile seals 212 surround the outer end portion of tubes 204 and the seals 212 will be extruded to seal the fluid connection between the sensor 204 and the isolator diaphragm as explained in connection with FIG. 3. Bolts 214 urge the first and second transmitter bodies together to compress and extrude the seals 212. A second set of extrusile seals 216 are provided in the first transmitter body to seal the interior cavity 218 of the first transmitter. Screws 220 are used to force ring 222 against the seals 216 to compress and seat the seals. The ring 222 operates similarly to ring 110 in FIG. 5 to extrude the seals into place. The interior cavity 218, which typically contains electronic circuits and controls, is sealed from process fluid contamination by both sets of seals to provide a higher degree of safety.

Although the present invention has been described with reference to preferred embodiments, workers skilled in the art will recognize that changes may be made in form and detail without departing from the spirit and scope of the invention.

What is claimed is:

1. A transmitter for providing an output indicative of a pressure of a process fluid, comprising:
   a first transmitter body having a first passageway filled with isolation fluid and extending from a first port on the first transmitter body to sensing means disposed in the first transmitter body for providing the output;
   a second transmitter body having an isolater diaphragm therein for isolating the process fluid from isolation fluid filling a second passage extending from the isolator diaphragm to a second port on the second transmitter body;
   a ring of a separate extrusile material disposed around one of said first and second ports; and
   means for urging the first and second transmitter bodies together such that the ring of extrusile material is extruded by contacting both bodies, sealingly coupling the ring to both the first and second ports and containing a selected quantity of the isolation fluid in the transmitter for coupling pressure from the isolator diaphragm to the sensing means.

2. The transmitter of claim 1 wherein said sensing means comprises a deflecting diaphragm dividing a chamber into chamber portions, each of said chamber portions being filled with isolation fluid and in fluid communication with a respective separate first passageway.

3. The transmitter of claim 1 wherein the ring of extrusile material is initially positioned on one of said transmitter bodies, and said one transmitter body having a recess surrounding said port and extending radially out from said port, the extrusile material being extruded radially in the recess as the transmitter bodies are urged together and the extrusile material is compressed.

4. The transmitter of claim 1 and means for reducing pressure to a side of the isolator diaphragm opposite from the isolation fluid filling the second passageway to control the volume of the isolation fluid in the second passageway and in contact with the isolator diaphragm prior to the time that the means for urging is operable to urge the first and second transmitter bodies together.

5. A transmitter for providing an output from a sensor, and having two transmitter bodies, a first of said transmitter bodies comprising a sensor, and a second of said transmitter bodies comprising an isolator diaphragm:
   passageway means in the each of said transmitter bodies positioned to be aligned with each other for fluid communication there between when the transmitter bodies are mounted together along an interface between the transmitter bodies; and
   a ring of extrusile material surrounding the aligning passageways in the interface between the transmitter bodies when the transmitter bodies are mounted together, said ring of extrusile material being initially in a first shape, and being extruded under compression load as the transmitter bodies are forced together to provide a seal between the transmitter bodies surrounding the passageways, whereby fluid in the passageways is sealingly trapped in such passageways and air is excluded from such passageways as the transmitter bodies are forced together.

6. The transmitter claim 5 wherein the passageway in one of said transmitter bodies has a outwardly tapered end portion forming a port adjacent to the interface with the other transmitter body.

7. The transmitter of claim 6 wherein said sensor is a pressure sensor, comprising a chamber having a deflecting diaphragm therein, said passageway in the first transmitter body comprising the sensor being fluidly coupled to said chamber, and wherein said isolator diaphragm in the second transmitter body defines a second chamber and the passageway in the second transmitter body leads from said second chamber.

8. The transmitter of claim 5 wherein one of said transmitter bodies has a recess surrounding the passageway in such one body which has a surface generally perpendicular to the direction that the transmitter bodies are moved as they are forced together and extending radially from the passageway, said ring of extrusile material being extruded radially in said recess as the transmitter bodies are forced together.

9. The transmitter of claim 5 wherein said ring of extrusile material comprises a metal, said transmitter bodies being made of metal to form metal to metal seals.

10. The transmitter of claim 5 wherein said passageways in both transmitter bodies are filled with a substantially incompressible isolation fluid prior to the time the transmitter bodies are forced together, and means for providing a selected fluid pressure to the isolation diaphragm on a side opposite from the isolation fluid trapped by said isolation diaphragm as the fluid is filled in the passageways of the second transmitter body.

11. The transmitter of claim 5 and means to apply a controlled pressure to the isolation diaphragm on the side thereof opposite from the passageway having isolation fluid therein when the second transmitter body is being filled with fluid.

* * * * *